H. TIMM.
STEERING APPARATUS FOR SHIPS.
APPLICATION FILED APR. 19, 1915.

1,220,026. Patented Mar. 20, 1917.

Inventor:
Hermann Timm

UNITED STATES PATENT OFFICE.

HERMANN TIMM, OF LUVERNE, MINNESOTA.

STEERING APPARATUS FOR SHIPS.

1,220,026.     Specification of Letters Patent.     Patented Mar. 20, 1917.

Application filed April 19, 1915. Serial No. 22,416.

*To all whom it may concern:*

Be it known that I, HERMANN TIMM, a citizen of Germany, and resident of Luverne, Minnesota, in the United States of America, have invented certain new and useful Improvements in Steering Apparatus for Ships, of which the following is a specification.

The invention relates to improvements in steering apparatus, particularly to that kind of steering apparatus adapted to act as an auxiliary means for steering a ship in case the main steering gear comes out of order.

Similar devices have been patented before. However these devices show the great disadvantage that they had to be operated by steam or other motoric forces requiring a special adjustment and special connections, the actuation and operation as well as the preparation for working of which consumed considerable time, which in case of accident will prove fatal, as can readily be imagined, especially if the steam generation or distribution is brought out of order by such an accident.

These dangers and disadvantages are overcome by the present invention by connecting the auxiliary steering gear directly to the main steering shaft of the vessel in such a manner that it will at all times be ready for instant use as soon as the main steering gear of the ship comes out of order or is damaged in any way.

Figure 1:
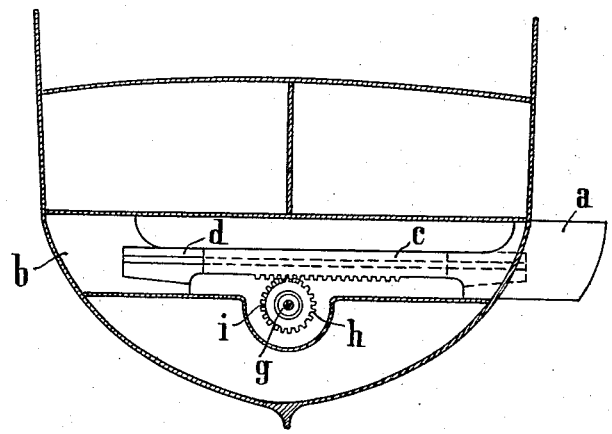
Figure 1 shows a transverse section of the ship with the steering apparatus.
Figure 2:
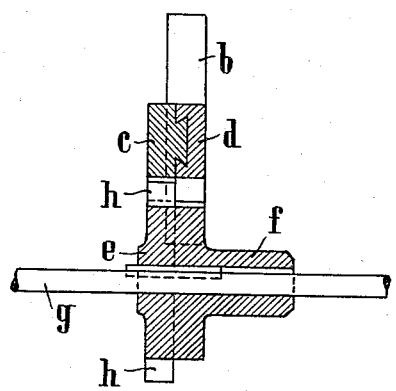
Fig. 2 shows a longitudinal section through the operating means.

The steering planes $a$ and $b$ adapted to be laterally pushed out of a ship's hull are each secured to a rack $c$ and $d$ respectively, which racks are connected by a projection of one of them entering a dove-tailed groove in the other rack.

A toothed wheel or gear $e$, rotatably secured upon the shaft $g$ of the main steering gear of the vessel, engages with the teeth of said rack bars. In order to enable said wheel to actuate both rack bars, one half of the teeth of said gear, designated $h$, is laterally displaced to the teeth $i$ from the other half of said gear $e$, so that the teeth $h$ mesh with the rack bar $c$ while the teeth $i$ of said gear mesh with the rack bar $d$.

Therefore upon the rotation of the driving shaft of the main steering gear, alternately one or the other of the rudders $a$ and $b$ will be laterally pushed out of the ship's hull according to necessity and occasion or requirement.

Having thus described my invention, what I claim as new and desire to secure by Letters Patent, is:—

1. An auxiliary steering apparatus for ships comprising in combination, wings adapted to be laterally projected from the sides of a ship, rack bars to which said wings are secured, a gear upon the shaft for the main steering gear of the ship adapted to mesh with said rack bars for alternately propelling said blades through an opening in the sides of the ship according to the rotation of said gear.

2. An auxiliary steering apparatus for ships comprising in combination with the main steering shaft, a gear upon said shaft, 50% of the teeth of said gear being laterally displaced from the other 50% of the same, two racks connected by a dove-tailed connection and adapted to be alternately engaged by the teeth of said gear upon the rotation of said shaft, and wings upon the outer ends of each of said racks for acting as steering blades in emergency cases, substantially as described.

In testimony whereof I affix my signature in presence of two witnesses.

HERMANN TIMM.

Witnesses:
C. J. MARTIN,
KARL OMODT.

Copies of this patent may be obtained for five cents each, by addressing the "Commissioner of Patents, Washington, D. C."